(12) United States Patent
Parihar et al.

(10) Patent No.: US 11,265,883 B1
(45) Date of Patent: Mar. 1, 2022

(54) DEDICATING ANTENNA ELEMENTS TO SPECIFIC WIRELESS DEVICES

(71) Applicant: Sprint Spectrum LP, Overland Park, KS (US)

(72) Inventors: Vanil Parihar, Overland Park, KS (US); Sreekar Marupaduga, Overland Park, KS (US); Nitesh Manchanda, Overland Park, KS (US); Rashmi Kumar, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 97 days.

(21) Appl. No.: 16/568,746

(22) Filed: Sep. 12, 2019

(51) Int. Cl.
  *H04W 72/06* (2009.01)
  *H04W 72/04* (2009.01)
  *H04B 7/0413* (2017.01)
  *H04W 88/04* (2009.01)
  *H04B 7/06* (2006.01)

(52) U.S. Cl.
  CPC ......... *H04W 72/06* (2013.01); *H04W 72/046* (2013.01); *H04B 7/0413* (2013.01); *H04B 7/0608* (2013.01); *H04W 72/0406* (2013.01); *H04W 88/04* (2013.01)

(58) Field of Classification Search
  CPC ........... H04W 72/046; H04W 72/1215; H04W 76/15–16; H04W 84/047; H04W 88/04–06; H04W 88/10
  See application file for complete search history.

(56) References Cited

U.S. PATENT DOCUMENTS

| | | | |
|---|---|---|---|
| 9,768,983 B2 | 9/2017 | Marzetta et al. | |
| 9,985,714 B1* | 5/2018 | Hou | H04B 7/0617 |
| 10,285,160 B2 | 5/2019 | Kyeong et al. | |
| 2014/0045541 A1* | 2/2014 | Moshfeghi | H04B 7/0689 455/500 |
| 2017/0048775 A1* | 2/2017 | Kim | H04W 76/18 |
| 2017/0208551 A1* | 7/2017 | Yang | H04W 72/1284 |
| 2017/0346525 A1* | 11/2017 | Stirling-Gallacher | H04B 7/0695 |
| 2019/0372650 A1* | 12/2019 | Takii | H04B 7/0874 |
| 2020/0107309 A1* | 4/2020 | Akoum | H04B 7/088 |
| 2020/0170052 A1* | 5/2020 | Yang | H04W 28/26 |
| 2020/0396597 A1* | 12/2020 | Damnjanovic | H04W 8/24 |
| 2021/0007104 A1* | 1/2021 | Raghavan | H04W 28/0875 |

\* cited by examiner

*Primary Examiner* — Marcus Smith

(57) ABSTRACT

Dedicating antenna elements to specific wireless devices by identifying specific wireless devices that meet a set of criteria, such as relay nodes, stationary wireless devices, data-only wireless devices, and respectively dedicating a separate portion of antenna elements for communicating with each specific wireless device. The separate portion of antenna elements is selected based on being configured to utilize a bandwidth that meets a threshold bandwidth, such as a 40 MHz bandwidth offered in 5G communications.

20 Claims, 7 Drawing Sheets

DEDICATING ANTENNA ELEMENTS TO SPECIFIC WIRELESS DEVICES

TECHNICAL BACKGROUND

As wireless networks evolve and grow, there are ongoing challenges in providing high-quality service to increasing numbers of wireless devices in various coverage areas of a wireless network. One approach to improving service quality and coverage is to implement relay nodes for relaying communication between a base station or donor access node, and an end-user wireless device. Combinations of wireless devices designated as relays (henceforth, "relay wireless devices") that are co-located with relay access points may be used at the edge of a coverage area of a donor access node to improve coverage and/or service, as well as in crowded areas having a high number of other wireless devices to increase the available throughput to the end-user wireless devices being relayed. Further, "Dual Connectivity" refers to the ability for wireless devices to attach to two or more access nodes and transmit/receive information via two wireless connections simultaneously. In exemplary situations where radio access technologies (RATs) such as 5G New Radio (NR) are being implemented alongside existing RATs such as 3G and 4G Long Term Evolution (LTE), dual connectivity can include E-UTRAN-NR Dual Connectivity (EN-DC), which uses both 4G and 5G RATs.

In these systems, there are additional considerations regarding how relay nodes can effectively service wireless devices that are attached to it. For example, relay nodes that operate using the 4G RAT may be in contention with legacy wireless devices also attached to the 4G RAT due to, for instance, operating on a narrower-bandwidth (i.e. 20 MHz) channel associated with 4G. Further, even if the relay nodes are attached to the 5G RAT using, for example, EN-DC, increasing proliferation of 5G capable wireless devices may cause further contention for resources between relay nodes and other wireless devices. Other types of wireless devices may suffer from similar issues, such as stationary wireless devices, small-cells, etc.

OVERVIEW

Exemplary embodiments described herein include systems, methods, and processing nodes for dedicating antenna elements to specific wireless devices. An exemplary method for dedicating antenna elements to specific wireless devices includes identifying a first wireless devices attached to an access node, wherein the first wireless device meets a set of criteria and, responsive to determining that the first wireless device meets the set of criteria, assigning a first portion of the antennae of the access node for communicating with the one or more wireless devices.

An exemplary system for dedicating antenna elements to specific wireless devices includes a processing node, and a processor coupled to the processing node. The processor can be configured to perform operations including identifying one or more wireless devices attached to an access node, wherein the one or wireless devices meet a set of criteria, and wherein the access node is communicatively coupled to a plurality of antenna elements and, responsive to determining that the one or more wireless devices meet the set of criteria, respectively dedicating a separate portion of antenna elements for communicating with each of the one or more wireless devices. Each separate portion is selected based on being configured to utilize a bandwidth that meets a threshold bandwidth.

An exemplary processing node for dedicating antenna elements to specific wireless devices includes identifying a relay node attached to an access node, wherein the relay node is capable of communicating using at least two radio access technologies (RATs), responsive to identifying the relay node, dedicating a first set of antenna elements of the access node for communicating data information with the relay node using a first RAT, and using a second set of antenna elements of the access node for communicating control information with the relay node using a second RAT. The first RAT has a greater bandwidth than the second RAT.

DETAILED DESCRIPTION

Figure 1:
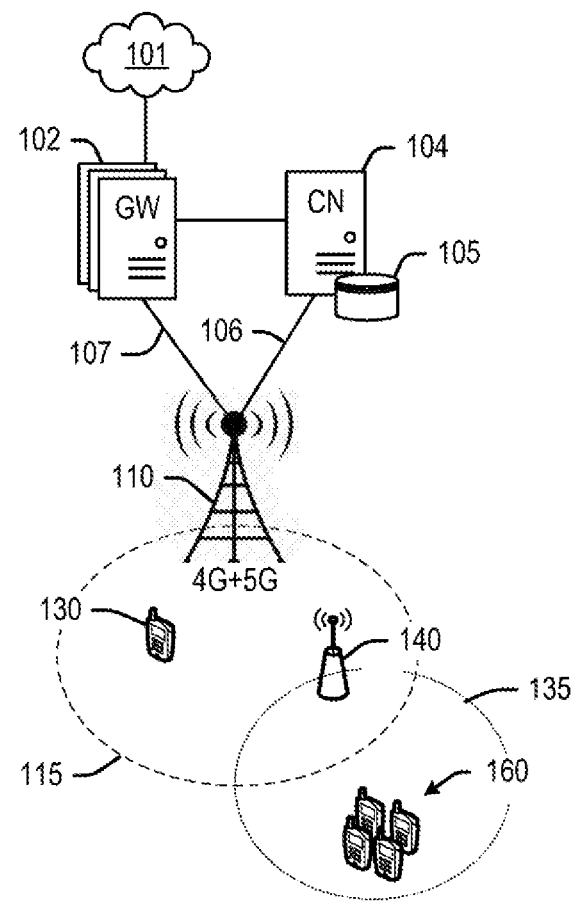
FIG. 1 depicts an exemplary system for dedicating antenna elements to specific wireless devices.

The following disclosure provides systems and methods for dedicating antenna elements of an access node towards communicating with specific wireless devices that meet a set of criteria, such as relay nodes, thereby ensuring that communication channels between access node and the specific wireless devices are not subject to interference or resource contention from other wireless devices. The first access node is combination of an eNodeB and a gNodeB. In other words, the first access node can comprise antennae that are configured to communicate using 4G LTE (i.e. the first RAT) as well as antennae that are configured to communicate using 5G NR (the second RAT). In another exemplary embodiment, the access node comprises an eNodeB that is communicatively coupled to a gNodeB. For example, an eNodeB can be coupled with a gNodeB via an X2 connection. Thus, exemplary embodiments disclosed herein include access nodes with a plurality of antenna elements, a portion of which are configured to utilize a first RAT (e.g. 4G LTE), and a portion of which are configured to utilize a second RAT (e.g. 5G NR). Whereas the 4G portion of antenna elements is configured to utilize a 15 MHz or 20 MHz channel bandwidth, the 5G portion of antenna elements is configured to utilize various bandwidths ranging from 15 MHz to 100 MHz.

Further, the specific wireless device may include any wireless device capable of multi-RAT communication, such as wireless devices comprising a gigabit-class LTE modem and a gigabit-class 5G modem. Such a wireless device can support high frequency, short wave length radio communication associated with 5G NR, and can be capable of adaptive beam-forming and beam tracking, 8× carrier aggregation (CA), combining different 100 MHz blocks of millimeter wave spectrum, etc. The specific wireless device can comprise a relay node that is configured to relay data between an access node and one or more end-user wireless devices attached to the relay node. The relay node may be a small cell access node, a home eNodeB, etc. For example, the relay node can be configured to attach to the first access node using both RATs. In an exemplary embodiment, the relay node includes a relay wireless device coupled to a relay access point, and is configured to relay data packets between an access node and an end-user wireless device attached to the relay access point. For example, the relay wireless device can be capable of communicating with the access node using both RATs. In embodiments where the wireless device comprises a relay node (or a relay wireless device coupled to a relay access point), the serving access node(s) may be referred to as donor access node(s), and any wireless connection between the donor access node(s) and the wireless device may be referred to as a backhaul connection.

As described herein, a plurality of antenna elements configured to utilize the higher bandwidth offered by 5G technology is dedicated for communicating with the specific wireless device. Since certain specific wireless devices, such as relay nodes, are configured to provide relayed services to a plurality of end-user wireless devices attached thereto, the dedicated antenna elements provide a higher quality of service and guaranteed bit rates to those end-user wireless devices, while any other wireless devices directly attached to the access node continue using shared (i.e. not dedicated) antenna elements. Further, since relay nodes (and other types of specific wireless devices) are usually stationary, measurement reports are disabled for these wireless devices, thereby saving additional resources and minimizing latency/delays. In addition, in 5G EN-DC systems, control transmissions continue to utilize the non-dedicated 4G antenna elements, reserving the 5G antenna elements for data communication (i.e. payloads, etc.) with the relay node/specific wireless devices. Generally, 5G NR utilizes larger channel bandwidths and frequencies than 4G LTE. Thus, transmitting data information using the second RAT (e.g. 5G) can be beneficial to network operation by, for instance, improving throughput, while transmitting signaling information using the first RAT (e.g. 4G) can be beneficial by, for instance, utilizing ubiquitous existing infrastructure for performing signaling operations. Specifically for relay nodes, dedicating a high-bandwidth portion of antenna ports provides more spectral efficiency for the backhaul. In an exemplary embodiment, the specific wireless device (e.g. relay node) is determined based on a public land mobile network (PLMN) identifier of the relay node, in that the criteria for the specific wireless device comprises a specific PLMN identifier (or list of specific PLMN identifiers).

These operations may be performed by an exemplary system described herein and comprising at least a processing node and a processor coupled to the processing node, and similar operations may be performed by a processing node communicatively coupled to any other network node within the wireless network. These and other embodiments are further described herein and with reference to FIGS. 1-10.

FIG. 1 depicts an exemplary system 100 comprising a communication network 101, gateway 102, controller node 104, access node 110, wireless device 130, relay node 140, and end-user wireless devices 160. In this exemplary embodiment, access node 110 may be configured to deploy carriers using at least two RATs, e.g. 4G LTE and 5G NR, over a coverage area 115. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. Further, access node 110 can be configured to communicate using both RATs at the same time. For example, access node 110 can comprise antennae that are configured to communicate using 4G LTE (i.e. the first RAT) as well as antennae that are configured to communicate using 5G NR (the second RAT). In an exemplary embodiment, such communication may be referred to as 5G EN-DC, wherein the access node 110 is configured to initiate dual connections with a wireless device using both 4G and 5G carriers, the 4G carrier being used to transmit control information, and the 5G carrier being used to transmit data information. In other embodiments, access node 110 may comprise an eNodeB that is coupled to another access node comprising a gNodeB (not shown), such that the dual connectivity utilizes both access nodes. Further, in other embodiments, access node 110 can be among a plurality of access nodes, with various carriers deployed therefrom, as may be evident to those having ordinary skill in the art in light of this disclosure.

By virtue of being within coverage area 115, both wireless device 130 and relay node 140 can be in direct communication with access node 110. Further, relay node 140 may be configured to deploy another carrier over a coverage area 135 (that may utilize the same or different frequency, operating mode, or channel bandwidth as the 4G LTE or 5G NR carriers), to which end-user wireless devices 160 can attach. Relay node 140 can be configured to relay data packets between end-user wireless devices 160 and access node 110, which may be referred to as a "donor" access node when communicating via relay node 140. Thus, wireless devices 160 that are outside a coverage area of donor access node 110 may access network services from donor access node 110 by virtue of being connected to relay node 140. Further, wireless device 130 and relay node 140 may be capable of communicating with access node 110 using both first and second RATs. For example, both wireless device 130 and relay node 140 can include 4G LTE and 5G NR transceivers. Moreover, a processing node within system 100 (for example, communicatively coupled to access node 110, controller node 104, or any other network node) can be configured to determine whether or not wireless device 130 or relay node 140 are capable of communicating using both RATs, and instruct the access node 110 to broadcast an indicator in, for example, a system information message. For example, access node 110 may use the 4G carrier to control and set up a dual connectivity session with one or both of wireless device 130 and relay node 140. In other words, control information (including SIB messages) is transmitted from the access node 110 using the 4G carrier, while the 5G carrier is utilized for transmission of data.

Further, the processing node may be configured to perform operations including determining that one or both of wireless device 130 and/or relay node 140 meets a set of criteria, responsive to which a first portion of the antennae of access node 110 are assigned for communicating with wireless device 130 and/or relay node 140. Assigning the antennae includes allocating resources used to communicate with wireless device 130 and/or relay node 140 (such as resource blocks, bearers, channels, etc.) to antenna elements of access node 110 that are configured to use a higher bandwidth, such as 5G antenna elements. The higher bandwidth may be determined based on a threshold bandwidth. For example, any antenna element utilizing a bandwidth of greater than a threshold (e.g. 40 MHz) may be termed as using a higher bandwidth. Further, the assignment is maintained for communication with wireless device 130 and/or relay node 140 for as long as needed, thus may be termed a dedicated assignment. In other words, while other wireless devices attached to access node 110 (not shown herein) share antenna elements dynamically based on their location, signal conditions, etc., relay node 140 and/or wireless device 130 are assured continued and dedicated communication via the dedicated portion of antenna elements as a consequence of meeting specific criteria.

In an exemplary embodiment, the set of criteria comprise one or more of a stationary wireless device, a data-only wireless device, or a relay node. In other words, either wireless device 130 or relay node 140 would be assigned dedicated antenna elements if it meets any of the set of criteria identified above. Since relay nodes are usually stationary, relay nodes in particular can automatically satisfy the criteria without having to report mobility, location, etc. In an exemplary embodiment, a PLMN from a relay node 140 is transmitted to access node 110, upon which access node 110 recognizes that relay node 140 is a specific wireless device that meets the criteria. Further in an exemplary embodiment, a size of the first portion of antennae assigned to the relay node 140 based in part on a number of end-user wireless devices 160 attached to the relay node.

As described herein, the access node 110 includes (or is communicatively coupled to) a plurality of antenna elements, which may collectively comprise an antenna array. A first portion of antenna elements of the antenna array may be dedicated to communication with wireless device 130 and/or relay node 140. The first portion of antenna elements can be configured to utilize a higher bandwidth, such as used for 5G communication. Further, the antenna array of access node 110 can include a second portion of antenna elements configured to utilize a second bandwidth, such as a lower bandwidth used for 4G communication. Thus, dedicated communication with the wireless device 130 and/or the relay node 140 can include scheduling data information with the wireless device 130 and/or the relay node 140 using resources allocated towards the first plurality of antenna elements and scheduling control information using resources allocated towards the second plurality of antenna elements.

In an exemplary embodiment, different sets of antenna elements are dedicated for each of wireless device 130 and relay node 140. For example, if a third wireless device (not shown herein) met the set of criteria and was identified as being attached to the access node 110, a third portion of antennae elements would be dedicated towards communicating with the second wireless device. Further, a size of portion of antenna elements can be dynamically adjusted based on a number of specific wireless devices that meet the criteria, as well is based on which criteria are met by each specific wireless device. For example, one or more characteristics of each specific wireless device may be obtained (e.g. relay node, stationary relay, stationary wireless device, small cell, 5G EN-DC capable wireless device, etc.), and the antenna elements split into several portions based in part on the quantity of identified specific wireless devices that meet the criteria and based on part on the criteria that each specific wireless device meets. Further in an exemplary embodiment, an amount of resources (including power levels, resource blocks, etc.) can be assigned to each portion of antenna elements based on the characteristic of each specific wireless device or criteria that each specific wireless device meets.

Access node 110 can be any network node configured to provide communication between wireless devices 130, 160 and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area 115 in the range of approximately five kilometers to thirty-five kilometers and an output power in the tens of watts. Further, relay node 140 may comprise any combination of a relay wireless device capable of communicating over a wireless backhaul, and a small-cell access node capable of deploying a wireless air interface for wireless devices 160. Relay node 140 may comprise any short range, low power, small-cell access nodes such as a microcell access node, a picocell access node, a femtocell access node, or a home eNodeB device.

Access node 110 and relay node 140 can comprise a processor and associated circuitry to execute or direct the execution of computer-readable instructions to perform operations such as those further described herein. Briefly, access node 110 and relay node 140 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay node 140 can receive instructions and other input at a user interface. Access node 110 communicates with gateway node 102 and controller node 104 via communication links 106, 107. Access node 110 may communicate with each other, and other access nodes (not shown), using a wireless link or a wired link such as an X2 link. Components of exemplary access node 110, relay node 140, and processing nodes coupled thereto, are further described with reference to FIGS. 3-7.

Wireless devices 130, 160 may be any device, system, combination of devices, or other such communication platform capable of communicating wirelessly with access node 110 and/or relay node 140 using one or more frequency bands deployed therefrom. Each of wireless devices 130, 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 160. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as antenna information of access node 110, capabilities of wireless device 130 and relay node 140, information about wireless devices 160, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access node 110, controller node 104, and/or networks 101, 201.

Figure 2:
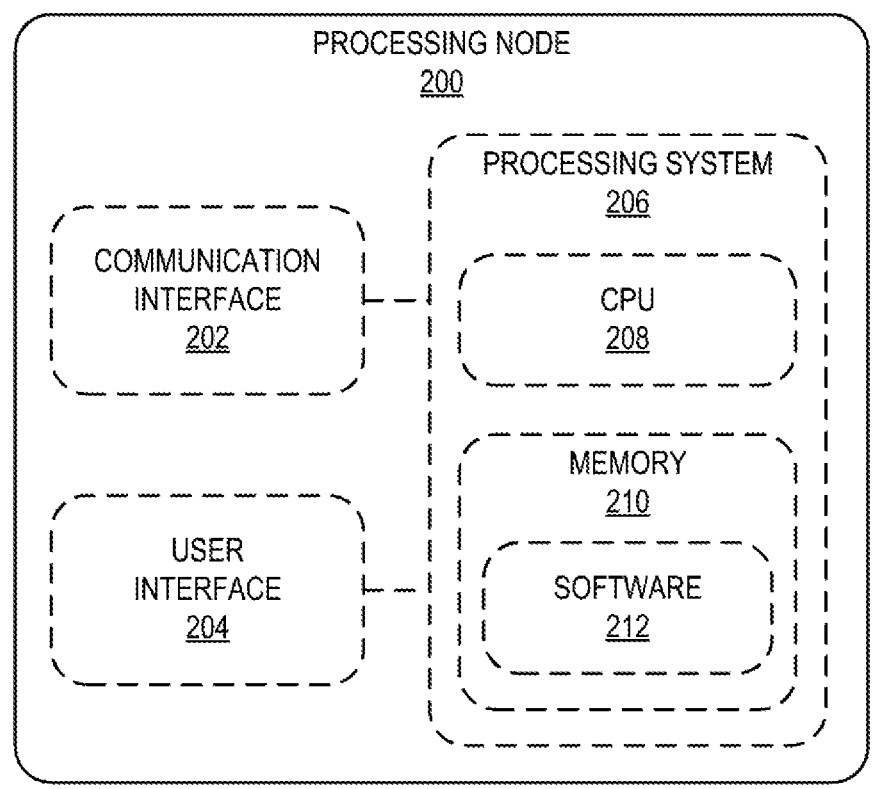
FIG. 2 depicts an exemplary processing node for dedicating antenna elements to specific wireless devices.

FIG. 2 depicts an exemplary processing node 200 for mitigating interference. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the interference mitigation operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
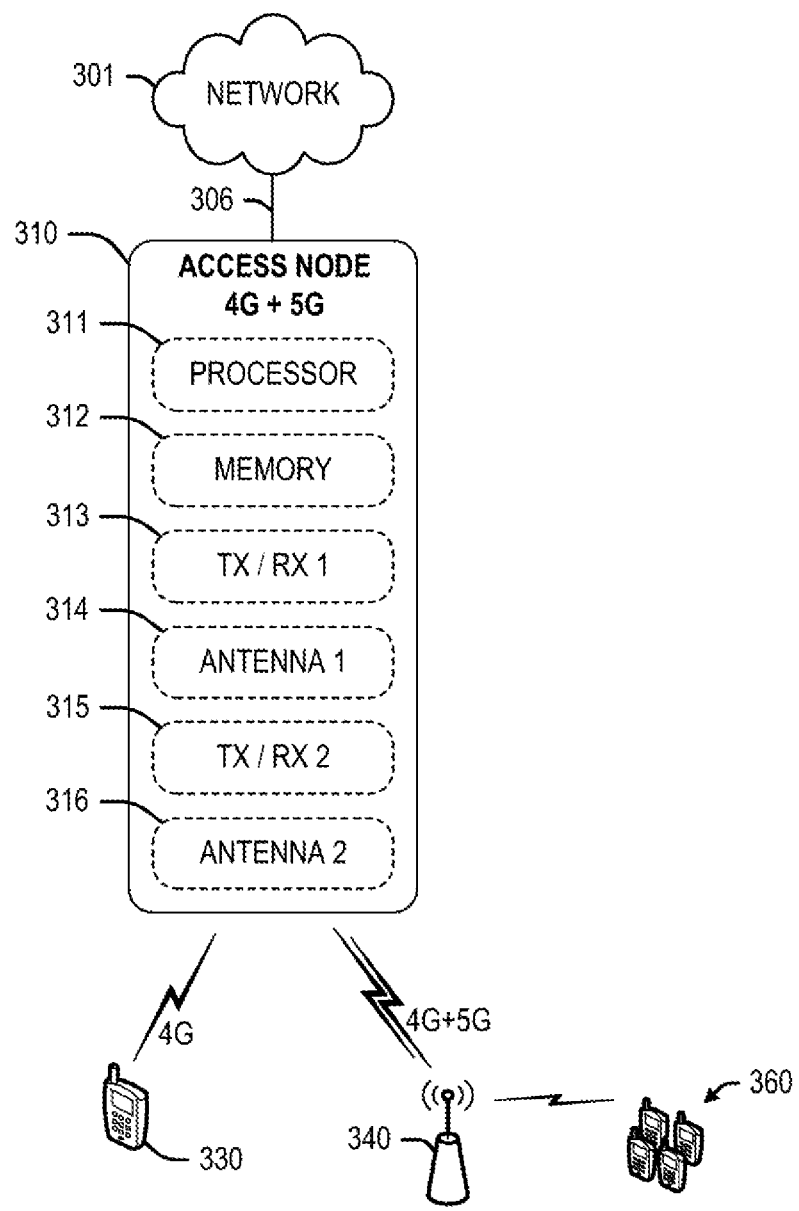
FIG. 3 depicts an exemplary access node for dedicating antenna elements to specific wireless devices.

In an exemplary embodiment, software 212 can include instructions for identifying a relay node attached to an access node, wherein the relay node is capable of communicating using at least two radio access technologies (RATs), responsive to identifying the relay node, dedicating a first set of antenna elements of the access node for communicating data information with the relay node using a first RAT, and using a second set of antenna elements of the access node for communicating control information with the relay node using a second RAT, wherein the first RAT has a greater bandwidth than the second RAT. For example, the first RAT comprises 4G and the second RAT comprises 5G, and the first RAT has a bandwidth of at least 40 MHz. In another exemplary embodiment, software 212 can include instructions for identifying one or more wireless devices attached to an access node, wherein the one or wireless devices meet a set of criteria, and wherein the access node is communicatively coupled to a plurality of antenna elements, and responsive to determining that the one or more wireless devices meet the set of criteria, respectively dedicating a separate portion of antenna elements for communicating with each of the one or more wireless devices, wherein each separate portion is selected based on being configured to utilize a bandwidth that meets a threshold bandwidth FIG. 3 depicts an exemplary access node 310. Access node 310 may comprise, for example, a macro-cell access node, such as access node 110 described with reference to FIG. 1. Access node 310 is illustrated as comprising a processor 311, memory 312, transceiver 313, antenna 314, transceiver 315, and antenna 316. Processor 311 executes instructions stored on memory 312, transceiver 313 and antenna 314 enable wireless communication using a first RAT (e.g. 4G LTE), and transceiver 315 and antenna 316 enable wireless communication using a second RAT (e.g. 5G NR). Thus, access node 310 may be determined as being capable of communicating using both 4G LTE and 5G NR. For example, access node 310 may be configured to transmit control information using the 4G LTE transceivers and data information using the 5G NR transceivers. Further, each antenna 314, 316 may include an array of antennae that are configured to deploy a radio air interface over one or more wireless sectors, form beams within these sectors, employ multiple-input-multiple-output (MIMO), etc.

Exemplary instructions stored on memory 312 can include instructions for determining that one or both of wireless device 330 and/or relay node 340 meets a set of criteria, responsive to which a first portion of the antennae of access node 310 are assigned for communicating with wireless device 330 and/or relay node 340. Assigning the antennae includes allocating resources used to communicate with wireless device 330 and/or relay node 340 (such as resource blocks, bearers, channels, etc.) to antenna elements of access node 310 that are configured to use a higher bandwidth, such as 5G antenna elements. The higher bandwidth may be determined based on a threshold bandwidth. For example, any antenna element utilizing a bandwidth of greater than a threshold (e.g. 40 MHz) may be termed as using a higher bandwidth. Further, the assignment is maintained for communication with wireless device 330 and/or relay node 340 for as long as needed, thus may be termed a dedicated assignment. In other words, while other wireless devices attached to access node 310 (not shown herein) share antenna elements dynamically based on their location, signal conditions, etc., relay node 340 and/or wireless device 330 are assured continued and dedicated communication via the dedicated portion of antenna elements as a consequence of meeting specific criteria.

In an exemplary embodiment, the set of criteria comprise one or more of a stationary wireless device, a data-only wireless device, or a relay node. In other words, either wireless device 330 or relay node 340 would be assigned dedicated antenna elements if it meets any of the set of criteria identified above. Since relay nodes are usually stationary, relay nodes in particular can automatically satisfy the criteria without having to report mobility, location, etc. In an exemplary embodiment, a PLMN from a relay node 340 is transmitted to access node 310, upon which access node 310 recognizes that relay node 340 is a specific wireless device that meets the criteria. Further in an exemplary embodiment, a size of the first portion of antennae assigned to the relay node 340 based in part on a number of end-user wireless devices 360 attached to the relay node.

As described herein, the access node 310 includes (or is communicatively coupled to) a plurality of antenna elements, which may collectively comprise an antenna array. A first portion of antenna elements of the antenna array may be dedicated to communication with wireless device 330 and/or relay node 340. The first portion of antenna elements can be configured to utilize a higher bandwidth, such as used for 5G communication. Further, the antenna array of access node 310 can include a second portion of antenna elements configured to utilize a second bandwidth, such as a lower bandwidth used for 4G communication. Thus, dedicated communication with the wireless device 330 and/or the relay node 340 can include scheduling data information with the wireless device 330 and/or the relay node 340 using resources allocated towards the first plurality of antenna elements and scheduling control information using resources allocated towards the second plurality of antenna elements.

In an exemplary embodiment, different sets of antenna elements are dedicated for each of wireless device 330 and relay node 340. For example, if a third wireless device (not shown herein) met the set of criteria and was identified as being attached to the access node 310, a third portion of antennae elements would be dedicated towards communicating with the second wireless device. Further, a size of portion of antenna elements can be dynamically adjusted based on a number of specific wireless devices that meet the criteria, as well is based on which criteria are met by each specific wireless device. For example, one or more characteristics of each specific wireless device may be obtained (e.g. relay node, stationary relay, stationary wireless device, small cell, 5G EN-DC capable wireless device, etc.), and the antenna elements split into several portions based in part on the quantity of identified specific wireless devices that meet the criteria and based on part on the criteria that each specific wireless device meets. Further in an exemplary embodiment, an amount of resources (including power levels, resource blocks, etc.) can be assigned to each portion of antenna elements based on the characteristic of each specific wireless device or criteria that each specific wireless device meets.

Figure 4:
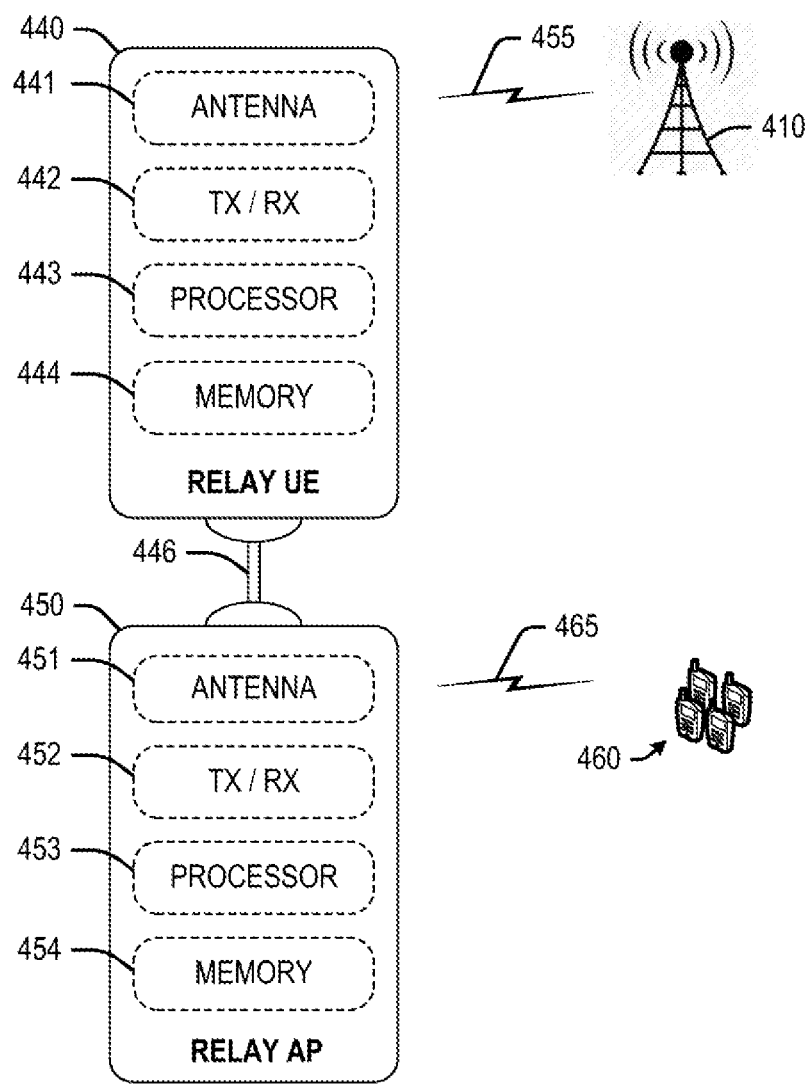
FIG. 4 depicts an exemplary relay node comprising a relay wireless device and a relay access point.

FIG. 4 depicts an exemplary relay node comprising a relay wireless device 440 and a relay access point (AP) 450. Relay wireless device 440 is illustrated as comprising an antenna 441 for direct (i.e. unrelayed) communication with donor access node 410 via wireless backhaul link 445, a transceiver 442, a processor 443, and a memory 444 for storing instructions that enable relay wireless device 440 to perform operations described herein. In some embodiments, relay wireless device 440 is referred to as a customer premise equipment (CPE), which includes any stationary LTE and/or 5G NR wireless device having a stronger computational & RF capability versus standard wireless devices, as well as a directional antenna and a dedicated power supply, enabling relay wireless device 440 to efficiently provide resources to wireless devices 460 via relay access point 450. Consequently, relay access point 450 may be co-located with relay wireless device 440, and is connected to relay wireless device 440 via a communication interface 446. Communication interface 446 may be any interface that enables direct communication between relay wireless device 440 and relay access point 450, such as USB, FireWire, Ethernet, or any other serial, parallel, analog, or digital interface.

In operation, relay wireless device 440 may be configured to relay network services from donor access node 410 to wireless devices 460 via relay access point 450. Relay wireless device 440 may begin to function as a relay wireless device by sending a message to donor access node 410 to indicate to donor access node 410 that wireless device 440 is functioning as a relay wireless device. In some embodiments, relay wireless device 440 can request to send a buffer status report to donor access node 410. Donor access node 410 can grant this request in a conventional manner. Relay wireless device 440 may respond to the grant by sending a short buffer status report. This short buffer status report is associated with a logical channel group that indicates the buffer status report is communicating the status of relay wireless device 440 as a relay, and thus is not asking for additional resource allocations (like a 'conventional' buffer status report would indicate). In other words, when relay wireless device 440 responds with a buffer status report for the 'special' logical channel group, it means that the buffer status report is not actually reporting the status of a buffer. Rather, this buffer status report indicates that the wireless device is now functioning as a relay. Once status of relay wireless device 440 is established, relay wireless device 440 may instruct relay access point 450 to start accepting connection requests from one or more wireless devices such as wireless device 460. Further, relay access point 450 is illustrated as comprising an antenna 451 and transceiver 452 for enabling communication with wireless device 460, processor 453, and a memory 454 for storing instructions that are executed by processor 453. In some embodiments, relay access point 450 may be a home eNodeB. Moreover, although only one transceiver is depicted in each of relay wireless device 440 and relay access point 450, additional transceivers may be incorporated in order to facilitate communication across interface 426 and other network elements. For example, additional transceivers may be include to enable relay wireless device 440 to utilize dual connectivity using two or more RATs. Further, based on the indication of relay status, donor access node 410 may alter how relay wireless device 440 is treated. For example, relay wireless device 440 may be provided with preferential treatment because it is functioning as a relay. In an exemplary embodiment, a specific class indicator is assigned to wireless backhaul link 445 between relay wireless device 440 and donor access node 410. The class indicator may be a QCI that is different from other QCIs assigned to wireless devices that are directly connected to donor access node 410.

Figure 5:
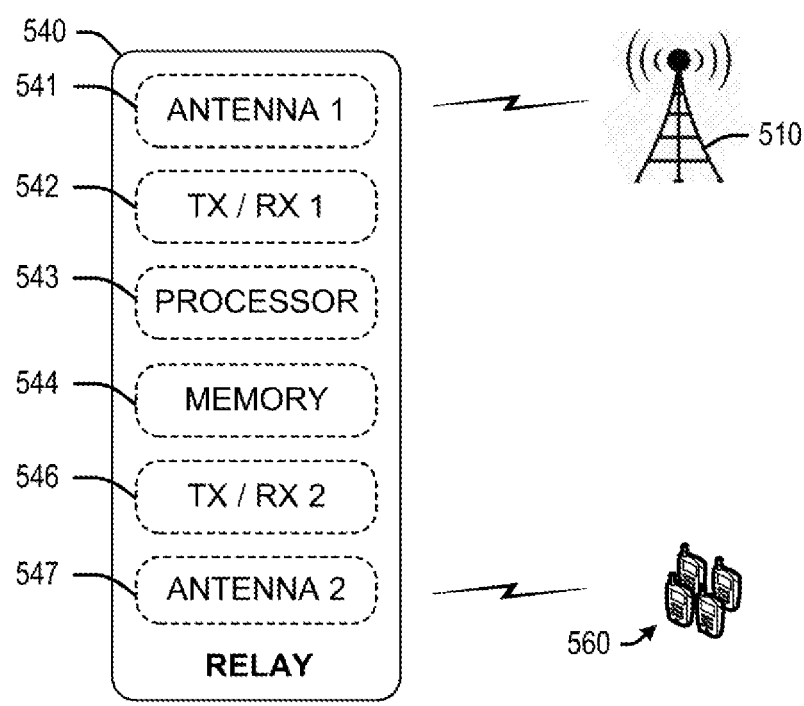
FIG. 5 depicts another exemplary relay node combining a relay wireless device and a relay access point.

In another exemplary embodiment, the relay node may integrate components of both relay wireless device 440 and relay access point 450 into a single unit. FIG. 5 depicts an exemplary relay node 540 of this type. Relay node 540 is illustrated as comprising an antenna 541 for direct (i.e. unrelayed) communication with donor access node 510 via wireless backhaul link 545, a transceiver 542, a processor 543, and a memory 544 for storing instructions that are executed by processor 543 as described herein. Relay node 540 further includes another transceiver 546 and antenna 547 for enabling communication with wireless device 560. Relay node 520 can perform operations similar to those described above with respect to FIG. 4.

In an embodiment, the relay nodes depicted in FIGS. 4-5 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to end-user wireless devices. Likewise, RF signals received from end-user wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/reassembly). In other words, relay node depicted herein performs demodulation and decoding of the received RF signals (either uplink or downlink), processes received data, then encodes, modulates, and transmits the data to a wireless device.

Figure 6:
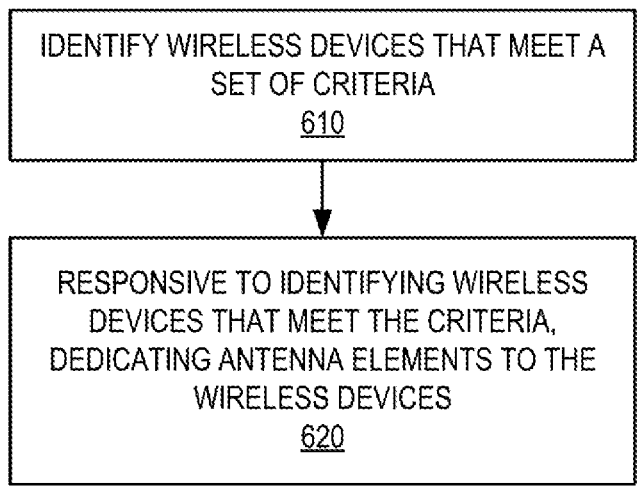
FIG. 6 depicts an exemplary method for dedicating antenna elements to specific wireless devices.

FIG. 6 depicts an exemplary method for dedicating antenna elements to specific wireless devices. The method of FIG. 6 may be implemented by a processing node communicatively coupled to one or more donor access nodes, relay nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, wireless devices that meet a set of criteria are identified as being attached to an access node and, at 620, antenna elements are dedicated towards communicating with the wireless devices that meet the criteria. The access node may include any combination of an eNodeB and a gNodeB. In other words, the access node can comprise antennae that are configured to communicate using 4G LTE (i.e. the first RAT) as well as antennae that are configured to communicate using 5G NR (the second RAT). In another exemplary embodiment, the access node comprises an eNodeB that is communicatively coupled to a gNodeB. For example, an eNodeB can be coupled with a gNodeB via an X2 connection. Whereas the 4G portion of antenna elements is configured to utilize a 15 MHz or 20 MHz channel bandwidth, the 5G portion of antenna elements is configured to utilize various bandwidths ranging from 15 MHz to 100 MHz.

Further, the wireless devices identified as meeting the criteria may include any wireless device capable of multi-RAT communication, such as wireless devices comprising a gigabit-class LTE modem and a gigabit-class 5G modem. Such a wireless device can support high frequency, short wave length radio communication associated with 5G NR, and can be capable of adaptive beam-forming and beam tracking, 8× carrier aggregation (CA), combining different 100 MHz blocks of millimeter wave spectrum, etc. The specific wireless device can comprise a relay node that is configured to relay data between an access node and one or more end-user wireless devices attached to the relay node. The relay node may be a small cell access node, a home eNodeB, etc. For example, the relay node can be configured to attach to the first access node using both RATs. In an exemplary embodiment, the relay node includes a relay wireless device coupled to a relay access point, and is configured to relay data packets between an access node and an end-user wireless device attached to the relay access point. For example, the relay wireless device can be capable of communicating with the access node using both RATs. In embodiments where the wireless device comprises a relay node (or a relay wireless device coupled to a relay access point), the serving access node(s) may be referred to as donor access node(s), and any wireless connection between the donor access node(s) and the wireless device may be referred to as a backhaul connection.

Thus at 620, a plurality of antenna elements configured to utilize the higher bandwidth offered by 5G technology is dedicated for communicating with the specific wireless device. Since certain specific wireless devices, such as relay nodes, are configured to provide relayed services to a plurality of end-user wireless devices attached thereto, the dedicated antenna elements provide a higher quality of service and guaranteed bit rates to those end-user wireless devices, while any other wireless devices directly attached to the access node continue using shared (i.e. not dedicated) antenna elements. Further, since relay nodes (and other types of specific wireless devices) are usually stationary, measurement reports are disabled for these wireless devices, thereby saving additional resources and minimizing latency/delays. In addition, in 5G EN-DC systems, control transmissions continue to utilize the non-dedicated 4G antenna elements, reserving the 5G antenna elements for data communication (i.e. payloads, etc.) with the relay node/specific wireless devices. Generally, 5G NR utilizes larger channel bandwidths and frequencies than 4G LTE. Thus, transmitting data information using the second RAT (e.g. 5G) can be beneficial to network operation by, for instance, improving throughput, while transmitting signaling information using the first RAT (e.g. 4G) can be beneficial by, for instance, utilizing ubiquitous existing infrastructure for performing signaling operations. Specifically for relay nodes, dedicating a high-bandwidth portion of antenna ports provides more spectral efficiency for the backhaul. In an exemplary embodiment, the specific wireless device (e.g. relay node) is determined based on a public land mobile network (PLMN) identifier of the relay node, in that the criteria for the specific wireless device comprises a specific PLMN identifier (or list of specific PLMN identifiers).

Figure 7:
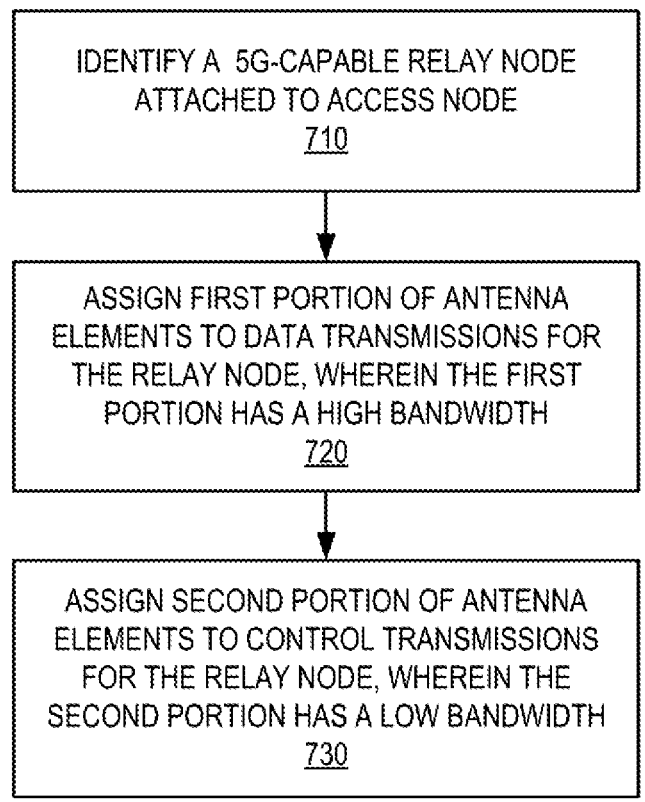
FIG. 7 depicts another exemplary method for dedicating antenna elements to specific wireless devices.

FIG. 7 depicts an exemplary method for dedicating antenna elements to specific wireless devices. The method of FIG. 7 may be implemented by a processing node communicatively coupled to one or more donor access nodes, relay nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, a 5G-capable relay node is identified as being attached to an access node. For example, the access node can comprise antennae that are configured to communicate using 4G LTE as well as antennae that are configured to communicate using 5G NR. In an exemplary embodiment, such communication may be referred to as 5G EN-DC, wherein the access node is configured to initiate dual connections with a wireless device using both 4G and 5G carriers, the 4G carrier being used to transmit control information, and the 5G carrier being used to transmit data information. Further, the relay node can be configured to relay data packets between end-user wireless devices and the access node, which may be referred to as a "donor" access node when communicating via relay node. Thus, wireless devices that are outside a coverage area of donor access node may access network services from donor access node by virtue of being connected to relay node. Further, the relay node may be capable of communicating with the access node using both first and second RATs. For example, the relay node can include 4G LTE and 5G NR transceivers. In an exemplary embodiment, a PLMN from the relay node is transmitted to the access node, upon which the access node recognizes that the relay node is a specific wireless device that meets the criteria. Further in an exemplary embodiment, a size of the first portion of antennae assigned to the relay node is based in part on a number of end-user wireless devices attached to the relay node.

Further, the relay node may be identified as meeting a set of criteria, responsive to which, at 720, a first portion of the antenna elements of the access node are assigned for dedicated communication with the relay node using 5G EN-DC. Dedicating the antennae includes allocating resources used to communicate with the relay node (such as resource blocks, bearers, channels, etc.) to antenna elements of the access node that are configured to use a higher bandwidth, such as 5G antenna elements. The higher bandwidth may be determined based on a threshold bandwidth. For example, any antenna element utilizing a bandwidth of greater than a threshold (e.g. 40 MHz) may be termed as using a higher bandwidth. Further, the assignment is maintained for communication with the relay node for as long as needed, thus may be termed a dedicated assignment. In other words, while other wireless devices attached to the access node share antenna elements dynamically based on their location, signal conditions, etc., the relay node is assured continued and dedicated communication via the dedicated portion of antenna elements as a consequence of meeting specific criteria.

Further, the antenna array of the access node can include a second portion of antenna elements configured to utilize a second bandwidth, such as a lower bandwidth used for 4G communication. Thus, while dedicated communication with the relay node can include scheduling data information with the relay node using resources allocated towards the first plurality of antenna elements at 720, control information can be scheduled using resources allocated towards the second plurality of antenna elements at 730. The control information can include, for instance, system information blocks (SIB) transmission, radio resource control (RRC) signaling, and other control information transmission used to set up bearers and communication channels using the 5G high-bandwidth antenna elements.

Figure 8A:
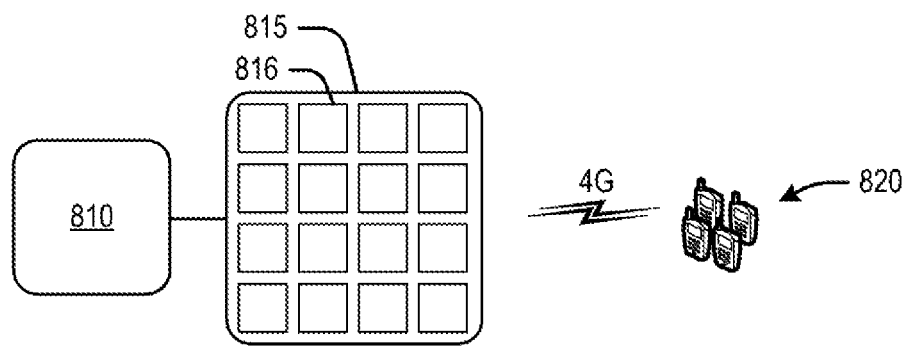
FIGS. 8A-8C depict exemplary assignments of antenna elements for dedicated communication with specific wireless devices.
Figure 8B:
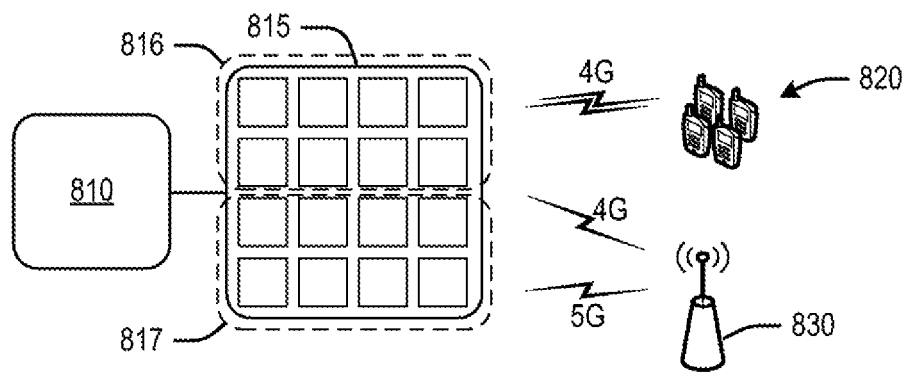
Figure 8C:
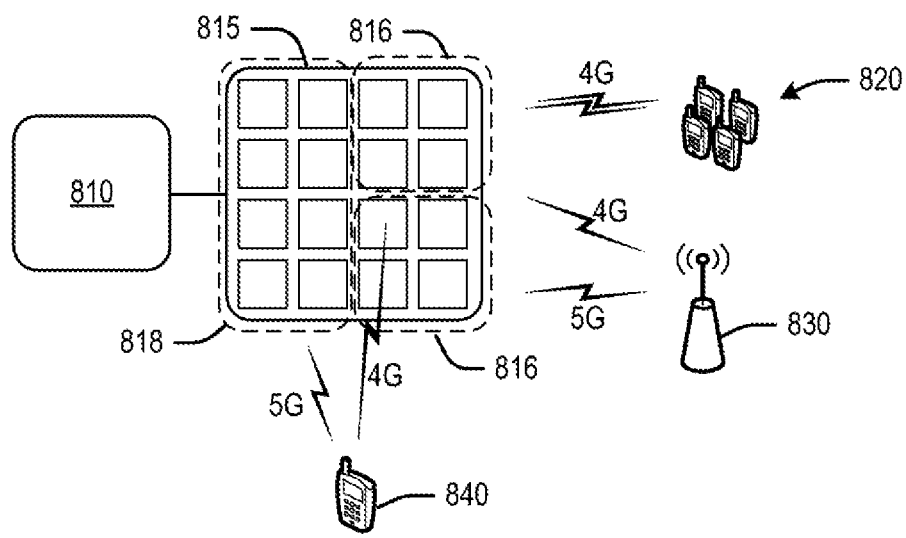

FIGS. 8A-8C illustrate exemplary assignments of portions of antenna elements 816 to specific wireless devices. In this exemplary embodiment, access node 810 may be configured to deploy carriers using at least two RATs, e.g. 4G LTE and 5G NR, with each RAT configured to utilize a different frequency band or sub-band, a different channel size or bandwidth, and so on. For example, the 5G NR carrier may be configured to utilize higher frequencies and larger channel bandwidths than the 4G LTE carrier. Further, access node 810 can be configured to communicate using both RATs at the same time using, for example, 5G EN-DC. With reference to FIG. 8A, access node 810 is illustrated as being coupled to an antenna array 815, within which antenna elements 816 are communicating with wireless devices 820 using 4G. There are no dedicated antenna elements here, since any of antenna elements 816 may be assigned resources to communicate with any of wireless devices 820. The usage and resource assignments of antenna elements 816 can vary based on reference signal measurement reports from each wireless device 820, among other factors.

With reference to FIG. 8B, a relay node 830 is illustrated as being attached to access node 810. A processing node within (or communicatively coupled to) access node 810 may be configured to perform operations including determining that relay node 830 meets a set of criteria, responsive to which the antenna array 815 is split into two portions, a first portion 816 and a second portion 817. While the first portion 816 continues to be used for non-dedicated 4G transmissions to wireless devices 820, the second portion 817 is assigned for dedicated communication with relay node 830. Assigning the portion 817 includes allocating resources used to communicate with relay node 830 (such as resource blocks, bearers, channels, etc.) to antenna elements within portion 817 that are configured to use a higher bandwidth, such as 5G antenna elements. The higher bandwidth may be determined based on a threshold bandwidth. For example, any antenna element utilizing a bandwidth of greater than a threshold (e.g. 40 MHz) may be termed as using a higher bandwidth. In other words, while other wireless devices 820 share antenna elements in portion 816 dynamically based on their location, signal conditions, etc., relay node 830 is assured continued and dedicated communication via the dedicated portion of antenna elements as a consequence of meeting specific criteria. Given that relay nodes are typically stationary, the dedicated communication can include instructing the relay node 830 not to submit reference signal measurement reports, which saves additional resources. Further, control transmissions between relay node 830 and access node 810 may utilize 4G antenna elements 816, with antenna elements 817 being dedicated for data transmissions to and from relay node 830.

With reference to FIG. 8C, another wireless device 840 is illustrated as attaching to access node 810. Wireless device 840 may satisfy one or more criteria of a set of criteria. In particular, wireless device 840 may be a stationary wireless device, a data-only wireless device, or a may satisfy some other criteria that requires communicating with dedicated antenna elements using 5G or any antenna elements that are configured to use a higher bandwidth. In an exemplary embodiment, wireless device 840 comprises any 5G-capable wireless device that is also capable of 5G EN-DC. Thus, antenna array 815 is split such that a third portion of antenna elements 818 is dedicated towards communicating with wireless device 840, with control transmissions continuing to utilize 4G antenna elements 816. Thus, a size of each portion of antennae (and resources allocated thereto) are dynamically assigned to each of wireless device 840 and relay node 830.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for dedicating antenna elements to specific wireless devices, the method comprising:
identifying a first wireless device of a plurality of wireless devices attached to an access node, wherein the first wireless device meets a set of criteria; and
responsive to determining that the first wireless device meets the set of criteria, assigning a first portion of the antennae of the access node for communicating with only the first wireless device and assigning a second portion of the antennae of the access node to be dynamically shared among other wireless devices of the plurality of wireless devices, wherein
the first portion comprises a first plurality of antenna elements from among an antenna array of the access node,
the first plurality of antenna elements being configured to utilize a first bandwidth, and
the antenna array further comprises a second plurality of antenna elements configured to utilize a second bandwidth, the second bandwidth being smaller than the first bandwidth.

2. The method of claim 1, wherein the set of criteria comprise one or more of the first wireless device comprising a stationary wireless device, the first wireless device comprising a data-only wireless device, or the first wireless device comprising a relay node.

3. The method of claim 2, wherein the relay node is configured to relay network services between the access node and the plurality of wireless devices attached to the relay node.

4. The method of claim 3, further comprising determining a size of the first portion of antennae assigned to the relay node based in part on a number of the plurality of wireless devices attached to the relay node.

5. The method of claim 1, wherein communicating with the wireless device using the first portion of antennae further comprises:
scheduling data information with the wireless device using resources allocated towards the first plurality of antenna elements; and
scheduling control information with the wireless device using resources allocated towards the second plurality of antenna elements.

6. The method of claim 5, wherein:
the first plurality of antenna elements is configured to utilize a first radio access technology (RAT), and
the second plurality of antenna elements is configured to utilize a second RAT.

7. The method of claim 6, wherein the first RAT comprises 5G new radio (NR) and the second RAT comprises 4G long term evolution (LTE).

8. The method of claim 1, further comprising:
identifying a second wireless device of the plurality of wireless devices meeting the criteria attached to the access node; and
assigning a third portion of antennae of the access node towards communicating with only the second wireless device.

9. The method of claim 8, further comprising dynamically adjusting a size of the first, second, and/or third portions of antennae based on one or more characteristics of each wireless device.

10. A system for dedicating antenna elements to specific wireless devices, the system comprising:
a processing node; and
a processor coupled to the processing node, the processor being configured to perform operations comprising:
identifying one or more wireless devices of a plurality of wireless devices attached to an access node, wherein the one or wireless devices meet a set of criteria, and wherein the access node is communicatively coupled to a plurality of antenna elements,
responsive to determining that the one or more wireless devices meet the set of criteria, respectively dedicating a separate portion of antenna elements for communicating with only a respective one of the one or more wireless devices and assigning a shared portion of antenna elements for communicating with other wireless devices of the plurality of wireless devices,
scheduling data transmissions for the one or more wireless devices via each respective separate portion using at least a threshold bandwidth, and
scheduling control transmissions for the one or more wireless devices via the shared portion configured to utilize a bandwidth that is less than the threshold bandwidth,
wherein each separate portion is selected based on being configured to utilize a bandwidth that meets the threshold bandwidth.

11. The system of claim 10, wherein the threshold bandwidth comprises 40 MHz.

12. The system of claim 10, wherein the set of criteria comprises one or more of a wireless device being a stationary wireless device, the wireless device being a data-only wireless device, or the wireless device being a relay node.

13. The system of claim 12, wherein the relay node is configured to relay network services between the access node and the plurality of wireless devices attached to the relay node.

14. The system of claim 13, wherein the operations further comprise determining a size of the separate portion of antenna elements dedicated to the relay node based in part on a number of the plurality of wireless devices attached to the relay node.

15. The system of claim 10, further comprising disabling measurement reports from the one or more wireless devices.

16. A processing node for dedicating antenna elements to specific wireless devices, the processing node being configured to perform operations comprising:
identifying a relay node attached to an access node, wherein the relay node is capable of communicating using at least two radio access technologies (RATS);
responsive to identifying the relay node, dedicating a first set of antenna elements of the access node for communicating data information with only the relay node using a first RAT;
using a second set of antenna elements of the access node for communicating control information with the relay node using a second RAT; and
using a third set of antenna elements of the access node to be dynamically shared for communication with at least one wireless device attached to the access node or the relay node,
wherein the first RAT has a greater bandwidth than the second RAT.

17. The processing node of claim 16, wherein the first RAT comprises 4G and the second RAT comprises 5G.

18. The processing node of claim 16, wherein the first RAT has a bandwidth of at least 40 MHz.

19. The processing node of claim 16, wherein the relay node is configured to relay network services between the access node and the at least one wireless device attached to the relay node.

20. The processing node of claim 16, the operations further comprising dynamically adjusting a number of antenna elements included in of the first, second, and/or third set of antenna elements based on one or more characteristics of the at least one wireless device.

* * * * *